Smith & Greig,
Separating Gas from Petroleum,
No. 42,121. Patented Mar. 29, 1864.

Witnesses

Inventors
James Smith
Allan Greig

UNITED STATES PATENT OFFICE.

ALLAN GREIG AND JAMES SMITH, OF TARRVILLE, PENNSYLVANIA.

IMPROVEMENT IN APPARATUS FOR SEPARATING GAS FROM PETROLEUM.

Specification forming part of Letters Patent No. 42,121, dated March 29, 1864.

*To all whom it may concern:*

Be it known that we, ALLAN GREIG and JAMES SMITH, both of Tarrville, in the county of Venango and State of Pennsylvania, have invented a new and Improved Apparatus for Separating Gas from Petroleum, &c.; and I do hereby declare that the following is a full, clear, and exact description of the same, reference being had to the accompanying drawings, making a part of this specification, in which—

Figure 1:
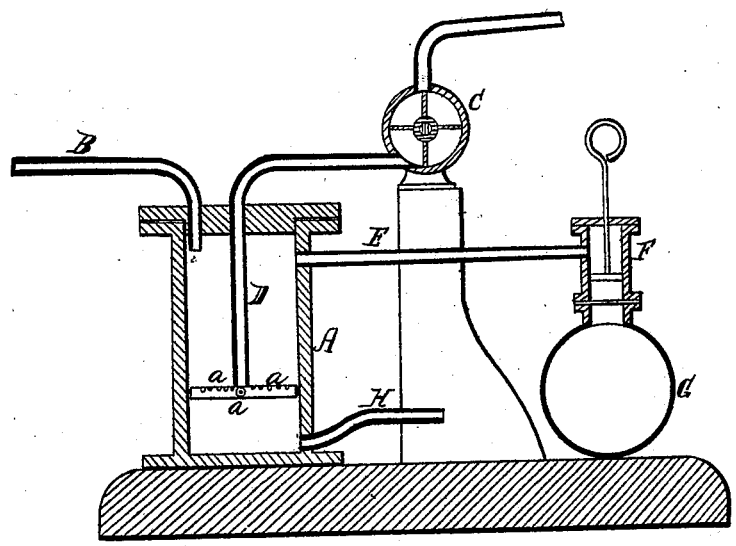
Figure 2:
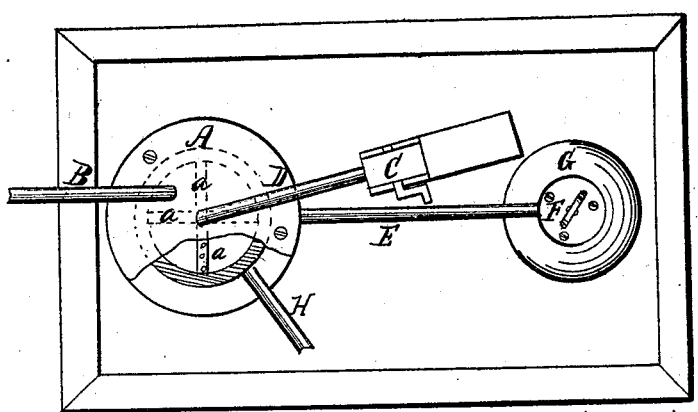

Figure 1 represents a longitudinal vertical section of my invention. Fig. 2 is a plan or top view of the same.

Similar letters of reference in both views indicate corresponding parts.

Petroleum, on being taken from the wells, contains a large quantity of gas, which, when separated from the oil, can be used for fuel, and also for the purpose of illumination; and, furthermore, by expelling the gas the inflammability of the oil and the danger of explosions consequent upon this inflammability are considerably reduced.

By the apparatus which forms the subject of this invention the gas is expelled from the oil by the action of a current of air forced in by a fan-blower or any other convenient means, and by the action of an air-pump it is stored up in a suitable receiver, from which it may be conducted through suitable pipes to the place or places of consumption.

To enable those skilled in the art to make and use our invention, we will proceed to describe it.

A represents a tank, of wood or any other suitable material, to which the oil is conducted through a pipe, B, as it comes from the well, whence it flows spontaneously in many cases; or it may be raised by a pump. In this tank the oil is exposed to a current of air forced in by a fan-blower, C, or any other equivalent means, through a pipe, D, which extends down near to the bottom of the tank, as shown in Fig. 1, and branches off at its bottom end into four (more or less) perforated arms, *a*. The air in passing through the perforations in the arms *a* is equally diffused throughout the oil in the tank, and it drives out the gas which is mixed with the oil, and which, together with the air, rises to the surface of the oil in the tank. A pipe, E, leads from the upper part of the tank to an air-pump, F, and by the action of this air-pump the gas rising from the oil is forced into the receiver G. The liquid oil, after having been freed from the gas, is drawn off through the pipe H, and the gas contained in the reservoir can be used either for fuel or for illuminating purposes. By these means a double advantage is obtained. In the first place the oil is freed from the gas, and its inflammability and quality to explode are thereby considerably reduced and the danger usually attending the operation of distilling the oil is greatly lessened; and in the second place the gas, which ordinarily escapes and is treated as waste, can thus be turned to a useful purpose and used for fuel or for illumination.

What we claim as new, and desire to secure by Letters Patent, is—

An apparatus consisting of a tank, A, blower C, air-pump F, receivers G, pipes D B H, and spreader *a*, arranged and operating substantially as described, to separate gas from oil.

ALLAN GREIG.
JAMES SMITH.

Witnesses:
A. D. MUNN,
JOHN S. TEATHER.